United States Patent [19]

Valdes-Neri et al.

[11] Patent Number: 4,687,503

[45] Date of Patent: Aug. 18, 1987

[54] APPARATUS FOR LOADING AND UNLOADING ARTICLES AT MACHINES FOR CUTTING OFF EXCESS ENDS OF HOLLOW GLASS, PLASTIC OR SIMILAR ARTICLES

[75] Inventors: Jaime Valdes-Neri, Guadalupe; Abel Gomez-Sanchez, Monterrey; Miguel H. Calderon-Quintero, San Nicolas de los Garza, all of Mexico

[73] Assignee: Vitrocrisa Cristaleria, S.A., Monterrey, Mexico

[21] Appl. No.: 898,383

[22] Filed: Aug. 20, 1986

[30] Foreign Application Priority Data

Sep. 2, 1985 [MX] Mexico ................................. 206483

[51] Int. Cl.⁴ ............................................ C03B 21/02
[52] U.S. Cl. ....................................... 65/174; 65/269; 65/271; 65/272; 65/280
[58] Field of Search ................. 65/174, 270, 271, 272, 65/280, 269

[56] References Cited

U.S. PATENT DOCUMENTS

| | | | |
|---|---|---|---|
| 1,596,733 | 8/1926 | Riggins | 65/270 |
| 2,595,077 | 4/1952 | Hughes et al. | 65/274 X |
| 3,730,699 | 5/1973 | Dichter | 65/272 X |
| 4,572,732 | 2/1986 | Gómez-Sánchez et al. | 65/271 |

Primary Examiner—Arthur Kellogg
Attorney, Agent, or Firm—Abelman Frayne Rezac & Schwab

[57] ABSTRACT

An apparatus for loading and unloading glass articles from an article cutting machine where the glass remainders of the said glass articles are removed during the manufacturing process. Said apparatus comprising: a supporting structure with a vertical shaft; means of rotating transference that are attached in axial coincidence with the said vertical shaft in order to hold and transport the articles; cams attached to the vertical shaft, wherein said transference means are placed in order to determine, through the cams the path that must be imparted to the said transference means; and drive means attached to the said transference means in order to make them rotate in a predetermined time relationship, at the stations positions of reception, feeding and delivery of articles.

10 Claims, 3 Drawing Figures

APPARATUS FOR LOADING AND UNLOADING ARTICLES AT MACHINES FOR CUTTING OFF EXCESS ENDS OF HOLLOW GLASS, PLASTIC OR SIMILAR ARTICLES

BACKGROUND OF THE INVENTION

In the manufacture of glass articles, such as glasses, glass light bulbs of the round type, etc., once the said articles have been manufactured in the appropiate machine, it is neccesary to transfer them through the use of adequate means to a cutting machine where the excess glass from articles are cut and the article is given a final finish. Once the operation has been undertaken, the said articles are transported to a tempering furnace in which they are relieved of stresses accumulated in the process of their manufacture.

The feeding of the glass articles to the cutting machine for cutting the excess glass from articles is not new since there exist diverse and varied patents in this field. However, one of the goals looked for is the production of articles of the best quality possible, at a high production rate and at a lesser cost.

An example of glass cutting machines is shown in the Mexican Patent Ser. No. 198,198 (U.S. Pat. No. 4,572,732). With this type of machine the loading and unloading of articles is done manually, and because of this a certain number of workers is needed in order to carry out the cutting operation.

Therefore, the invention that is presented here is related with the before mentioned cutting machines. Said invention will have as its object, receiving, feeding and delivering the glass articles that come from a forming machine to the said cutting machine in order to cut off the excess glass. The articles can be loaded and unloaded onto and from of machines for cutting glass articles through the use of an article transference mechanism.

This type of apparatus, made up of three geometrically placed stations 120° from each other will have the functions of receiving, feeding and delivering the glass articles, and the same is done at each station independently from each other. The said apparatus can receive at any of its stations the articles that come from the forming machine, and once it receives them it rotates towards another position in order to feed the articles to the burners of a cutting machine where the excess glass is removed. Once this operation is finished, the apparatus rotates again in order to deliver the articles to a transference mechanism which transports them on an assembly line belt to the tempering furnace.

This three station apparatus includes a series of supporting arms, which only open at the reception and delivery position of the article. This operation allows the articles transported by the transference mechanism to be freely handled by the supporting arms of said apparatus at the moment of loading and unloading.

SUMMARY OF THE INVENTION

Therefore, the principal objective of the present invention is to provide an article loading and unloading apparatus for machines for cutting off excess ends of hollow glass, plastic or similar articles, which automatically delivers said articles to said cutting machine.

Still another objective of the present invention is to provide and apparatus for the loading and unloading of articles for machines for cutting off excess ends of hollow glass plastic or similar articles, that provides an intermittent movement in such a way that the articles can be processed at its three stations simultaneously.

Another objective of the present invention is to provide an article loading and unloading apparatus for machines for cutting off excess ends of hollow glass, plastic or similar articles, whose operation is syncronized with a forming machine and said glass article cutting machine.

Another objective of the present invention is to provide an article loading and unloading apparatus for machines for cutting off excess ends of hollow glass, plastic or similar articles which can handle articles that have diverse geometric shapes keeping them centered (maintain them in a vertical position).

These and other objectives of the present invention will become evident to the experts in the field with the following detailed description of the invention. The description will make reference to the drawings which are attached and which illustrate the same. The description must be considered as illustrative of the invention but not limiting the same.

DESCRIPTION OF THE DRAWINGS.

Now, the invention will be described making reference to the drawings which are attached and which illustrate the same. The same numbers refer to the same parts showing the drawn figures as follows.

DETAILED DESCRIPTION OF THE INVENTION

Figure 1:
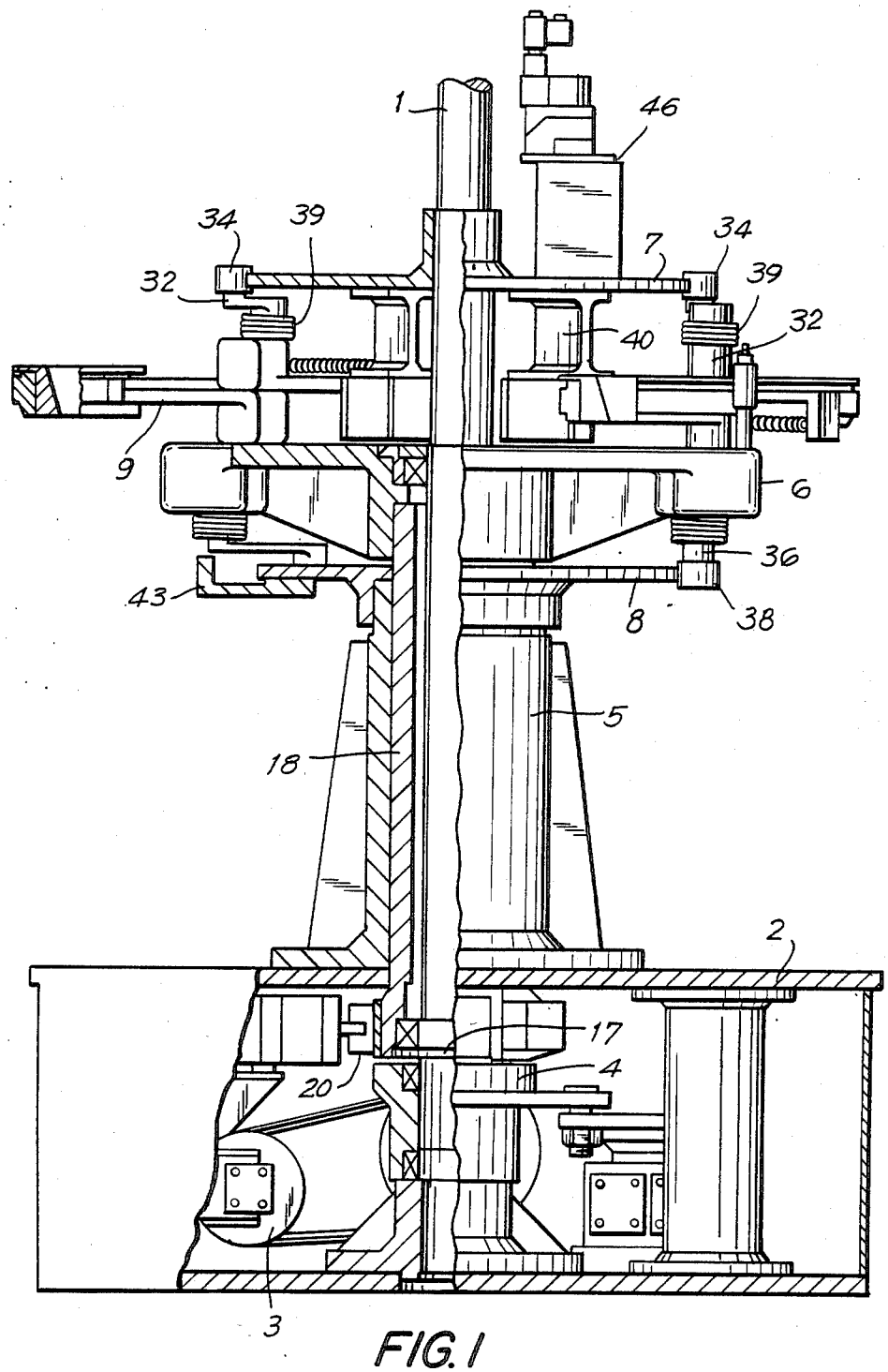
FIG. 1 is an elevated view of the apparatus of the present invention.
Figure 2:
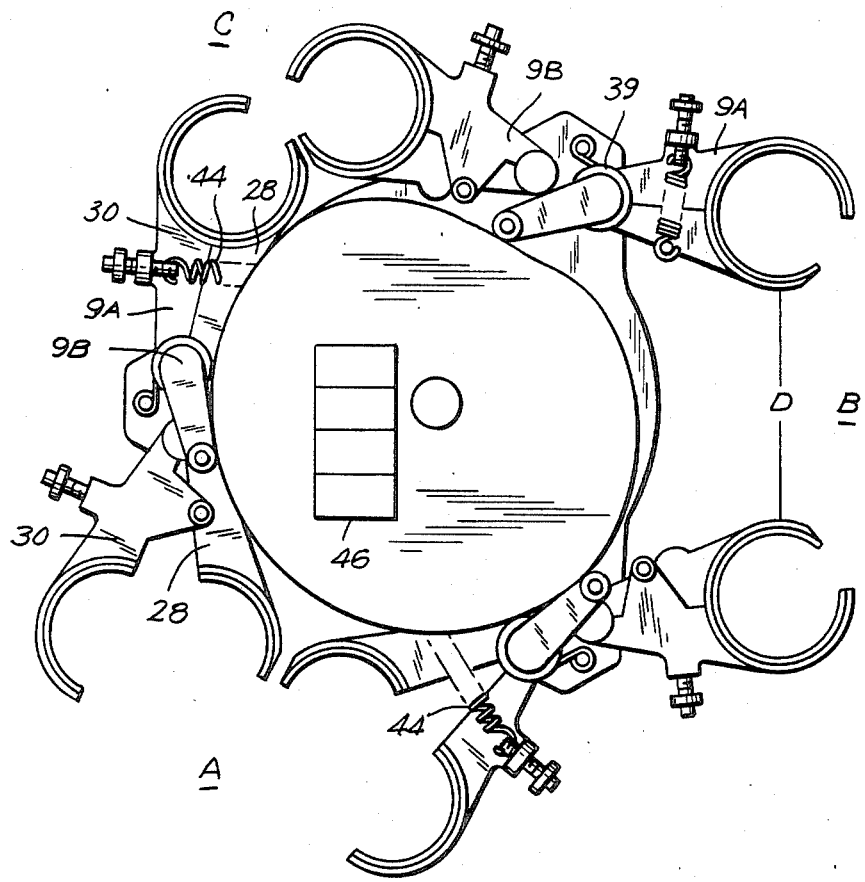
FIG. 2 is a top view that shows the upper part of the apparatus shown in FIG. 1.

Now making a more particular reference to the drawings, FIGS. 1 and 2 show an apparatus that loads and unloads recently formed glass articles, onto and from, a glass cutting machine (not shown) that cuts the excess glass. Said apparatus comprising: A central shaft 1 which is attached to a lower supporting structure 2 where there is installed a driving motor 3 and a driving mechanism 4. On the supporting structure 2 is placed a second structure 5 that coincides axially with the central shaft 1. Said second mentioned structure 5 supports a holding table 6 located between a pair of cams 7 and 8 which rotate with and intermittent movement through the mentioned attachment of said driving mechanism 4. This is done in order to provide reception A, feeding B and delivery C of the glass articles. Said holding table 6 contains a series of holders 9 which retain the articles and transport them to the diverse stations of the apparatus of the present invention. The holders 9 are synchronized through the use of adequate means that permit the loading and unloading of the articles.

Figure 3:
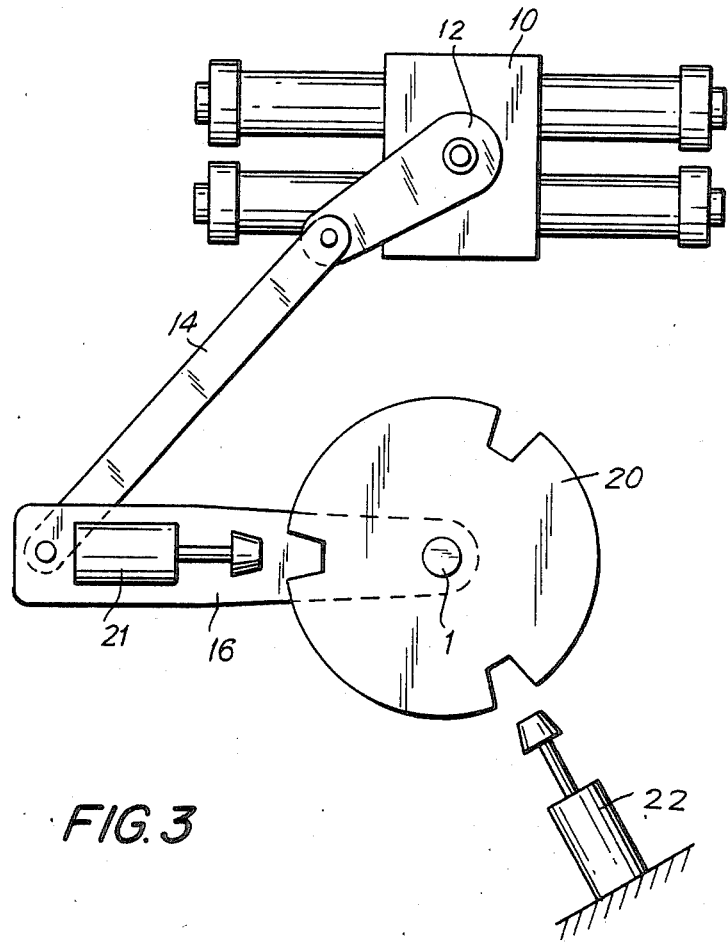
FIG. 3 is a detailed view of a drive mechanism which provides an intermittent rotation to the apparatus of the present invention.

Now making a more detailed reference to the apparatus of the present invention, the driving mechanism 4 (FIGS. 1 and 3) is made up by a rotating actuator 10 that is attached to the supporting structure 2 which provides advancing and returning movement to a handle 12. Said handle is itself linked to a connector 14 and to a dragging arm 16. The said dragging arm 16 is locked, on its free end, to a hollow shaft 18 located in axial coincidence with the central shaft 1 and the supporting structure 5. The hollow shaft 18 is united by its upper end to the holding table 6 in order to transmit the movement of the said driving mechanism 4 and by its lower end, as mentioned previously, to the dragging arm 16. The lower attachment is made through the use of a clutch 17 of the type that is firmly wedged in the direction of transmission and which is set free in the contrary direction. Besides, the stated hollow shaft 18 has attached to its lower end a disk with grooves 20 that are separated at 120 degrees from each other. Thus, every time that the dragging arm 16 is driven by the actuator 10, the set of shaft 18 and holding table 6 will have a rotating single direction movement. A pair of pistons 21, 22 located in coincidence with the grooves of the disk 2 engage alternately with at least two of the stated grooves of the disk 2 in order to momentarily set the position of the holding table 6 on the article reception A, feeding B and delivery C table. Thus the movement that is imparted to this holding table 6 is undertaken intermittently at the three previously mentioned positions.

Now making more particular reference to the holding table 6, the latter, as was previously mentioned, includes a series of holders 9, that is used to hold the articles. Said holders are positioned in pairs 9A and 9B at each one of the mentioned stations of said table 6 equidistant from each other. Each one of said holders 9A and 9B are divided in two halfs, and the same will be called pincers 28, 30 and at least one of these, in this case pincer number 30, opens up at the article reception and delivery position which permits the loading and unloading of the articles. Also, each holder 9A and 9B is independently pivoted on the stated holding table 6. The set up for each type of holder 9A and 9B is more clearly shown in FIG. 2.

With reference to the holder 9A, it is attached to an upper arm 32 with a roll 34 which is positioned at the profile of the cam 7. In the same way, holder 9B contains and lower arm 36, with a roll 38 which is positioned at the profile of the cam 8. Each one of said arms 32, 36 have a spring 39, which prevents that said arms 32, 36 to separate from the profile of said cams 7 and 8. Thus, each time that the holding table 6 rotates, holders 9A and 9B will be pivoted on the stated table 6 having the characteristic that at the feeding station, the stated holder 9A and 9B will separate at a greater distance D in order to position the articles at the burners of a cutting machine, as for example, is illustrated in the Mexican Patent Ser. No. 198,198 (U.S. Pat. No. 4,572,732). A pair of guides upper and lower 43, located at the stated feeding station will prevent the arms 32, 36 from losing their position at the time the articles are cut Thus the pivoting holders 9A and 9B located at the holding table 6 will be determined by the profile of the cams 7 and B.

With particular reference to FIG. 1, a series of pneumatic pistons 40 is shown, positioned at the lower part of the cam 7 in order to open one of the pincers, the number 30 of the holders 9A and 9B and is described as follows: the rod of each piston 40, is placed in coincidence with the external pincer 30 of the holders 9A and 9B in order to open said pincer 30 at the article loading and unloading position; one spring for each holder 9A and 9B unites each one of the pincers 28, 30 holding them in a closed position and a block of valves 46 positioned in the upper part of said cam 7, connected to the pistons 40, controls the opening of the holders 9 at the article reception and delivery stations.

With the objective of better understanding the functioning of the present invention now follows a brief description of the sequence followed by this machine as it handles the articles. Firstly, a pair of articles (not shown) will be deposited at the feeding station A, whether through the use of an article feeding mechanism (not shown) or by an operator. Before the reception of articles, the holders 9A and 9B will open their pincers 30 in order to permit the free handling of the articles in that zone and prevent that the said articles be broken at the moment of loading. Once the article is found in coincidence with the holdeers 9A and 9B the pincers 30 close around the articles and the same are firmly deposited on the holders 9A and 9B.

Once this operation has been undertaken, tha apparatus of the present invention, through the use of its table 6, will rotate 120°, placing the holders 9A and 9B in line with the cutters of the article cutting machine (not shown), for example, as is illustrated in the Mexican Patent Ser. No. 198,198. In this position, the holders 9A and 9B will present a greater separation between them in order to make easy the entrance of the burners around the stated articles. Later, once the cutting operation has been undertaken, the table 6 will rotate again 120° in order to position the holders 9A and 9B at the unloading station. At this station, a transference mechanism or an operator will remove the articles and the pincers 30 of the holders 9A and 9B will open to facilitate the removal of the same.

Even though the sequence, which is followed by the articles at one of the stations of the machine, has been described it must be understood that the article can be handled simultaneously at the three stations of the machine.

Finally, it must be understood that the apparatus of this invention, which has been described above, is only one modality offered as an illustration; and that experts in the field, because of the training from this invention, are capable of making changes in the design and distribution of the same and which would be in keeping with the true spirit and scope of the invention as attested to in the following claims.

We claim:

1. An apparatus for the loading and unloading of articles at machines for cutting off excess ends of hollow glass, plastic or similar articles which comprises a supporting structure which includes a vertical shaft; rotating transference means attached to axially coincide with the said vertical shaft in order to hold and transport the articles; cam means attached to the said vertical shaft, between which the mentioned transference means are attached, in order to determine by means of the profile of the cams, the path that must be imparted to said transference means; and driving means attached to the transference means in order to make them rotate in predetermined time relationships at the reception, feeding and delivery of article positions.

2. The apparatus as defined in claim 1 wherein the transference means comprises, a supporting table and holding means that are pivoted by one of its ends at the said supporting table for each one of the article receiving, feeding and delivery stations.

3. The apparatus as defined in claim 2 wherein the holding means are attached in pairs.

4. The apparatus as defined in claim 3, where in the holding means are divided in halves.

5. The apparatus as defined in claim 3, wherein each pair of holding means include: a lower or upper arm attached by one of its ends to each one of the holding means and which are pivoted on the supporting table and sliding means attached by the opposite end of each lower or upper arm and which are positioned at the profile of the cam means in order to pivot the stated holding means at the article receiving, feeding and delivery stations.

6. The apparatus as defined in claim 2 wherein the transference means include: control means positioned at the cam means in order to open at least one half of the holding means at the glass article reception and delivery positions.

7. The apparatus as defined in claim 6, wherein the control means comprises: a series of pistons placed on one the surfaces of the cam means, which are positioned to coincide with one of halves of the holding means in order to open at the article receiving and delivery positions; at least one spring for each one of the holding means in order to keep them in the closed position; and a valve block connected to said pistons in order to control the opening and closing speed of one of the halves of the holding means of said article receiving and delivery stations.

8. The apparatus as defined in claim 1, wherein the driving means comprises: a rotating actuator attached to the supporting structure; a handle attached by one of its ends to said rotating actuator and by its opposite end to a connector; and an arm connected to said connector in order to transmit the movement generated by the driving means to said rotating transference means.

9. The apparatus as defined in claim 1, wherein the driving means rotate intermittently with a movement each 120 degrees.

10. The apparatus as defined in claim 8, wherein the driving means include: at least one pair of pistons which momentarily fixes the position of the transference means at the article receiving feeding and delivery stations.

* * * * *